United States Patent [19]

Van den Berg

[11] Patent Number: 4,531,813
[45] Date of Patent: Jul. 30, 1985

[54] OVERHEAD VIEWING MIRROR APPARATUS FOR BEDRIDDEN AND PARALYZED PERSONS

[75] Inventor: Christiaan Van den Berg, Nijmegen, Netherlands

[73] Assignee: Wopex V.O.F., Nijmegen, Netherlands

[21] Appl. No.: 463,441

[22] PCT Filed: May 19, 1982

[86] PCT No.: PCT/EP82/00107
§ 371 Date: Jan. 18, 1983
§ 102(e) Date: Jan. 18, 1983

[87] PCT Pub. No.: WO82/03982
PCT Pub. Date: Nov. 25, 1982

[30] Foreign Application Priority Data

May 19, 1981 [DE] Fed. Rep. of Germany ....... 3119844

[51] Int. Cl.³ .............................................. G02B 5/08
[52] U.S. Cl. ..................................... 350/623; 350/632
[58] Field of Search ............... 350/299, 298, 301, 302, 350/307, 303, 304; 248/480–487, 469, 473, 474, 475 R, 476–479

[56] References Cited

U.S. PATENT DOCUMENTS 1,395,812 11/1921 Gerber .
1,444,599 2/1923 Frazin .
2,590,657 3/1952 Shepard .

FOREIGN PATENT DOCUMENTS 390059 7/1932 Belgium .
2308272 2/1973 Fed. Rep. of Germany .
657303 5/1929 France .
2386305 11/1978 France .

Primary Examiner—Bruce Y. Arnold

[57] ABSTRACT

An overhead viewing mirror apparatus for bedridden and paralyzed persons, comprising a vertically adjustable mount to which mirrors are attached, wherein a center mirror is provided which has a mirror surface on either side thereof and which is adapted to be pivoted from a vertical starting position over an angle of up to 30° to either side about an axis or shaft; one lateral mirror is each mounted on both sides of the center mirror in a position angularly inclined relative to the latter; and the whole mirror assembly is rotatable about a vertical axis or shaft.

8 Claims, 10 Drawing Figures

OVERHEAD VIEWING MIRROR APPARATUS FOR BEDRIDDEN AND PARALYZED PERSONS

The present invention relates to an overhead viewing mirror apparatus for bedridden and paralyzed persons, comprising a vertically adjustable mount to which mirrors are attached.

In a conventional apparatus of this type, a pair of mirrors which are angled relative to each other, are attached to a mount or bracket. These mirrors permit a bedridden person to look around without being required to sit up. A drawback is that the conventional apparatus permits only a view within a greatly limited dihedral angle, i.e. a view of the room within a limited angular range. In particular, the space behind the head end of the sick-bed cannot be overlooked. Although the mount is pivotable about a vertical axis, this pivotability can be made use of only to a small part since the mirror system leaves the viewer's field of view when it is swung over a wider range. Owing to the above limitations, the conventional apparatus particularly does not permit the sick person to control a motor-driven movable sick-bed with the aid of this apparatus.

It is the object of the present invention to provide an apparatus of the type as outlined at the beginning, in which the described drawbacks of the prior art are avoided and which enables the user to fully overlook the surroundings of the sick-bed. In particular, it should also be possible to overlook the space behind the head end of the bed, to thereby render possible the control of a motor-driven sick-bed with the aid of the apparatus.

According to the invention, this object is solved in that a center mirror is provided which has a mirror surface on either side thereof and which is adapted to be pivoted from a vertical starting position over an angle of up to 30° to either side about an axis or shaft;
one lateral mirror is each mounted on both sides of the center mirror in a position angularly inclined relative to the latter; and
the whole mirror assembly is rotatable about a vertical axis or shaft.

Preferably, the lateral mirrors are adapted to be pivoted or rotated relative to the center mirror. This feature widens the user's field of view.

A particularly comfortable use of the apparatus is obtained by the feature that pivoting movement of the center mirror and of the lateral mirrors and/or rotation of the entire mirror assembly are effected by driving devices which may be actuated by means of a control device.

Advantageously, the center mirror is formed as a parabolic mirror. This permits the apparatus to be used also for reading purposes. Preferably, the parabolic mirror is disposed on an extensible bellows, so that it can easily be brought into a position suitable for reading.

The mount of the apparatus according to the invention may be movable so that it may suitably be moved to the head end of a sick-bed. Alternatively, the mount may be designed so as to be attachable to the head end of a sick-bed. In this instance, the sick-bed is preferably movable by means of a driving device, and the apparatus according to the invention enables the sick person to fully view the surroundings when the bed is moved. In order to avoid the risk of accident, the center mirror and the side or lateral mirrors are preferably formed of non-shattering glass, for example, plexiglass.

Below, exemplary embodiments of the invention are explained in greater detail by referring to the drawings, wherein.

Figure 1:
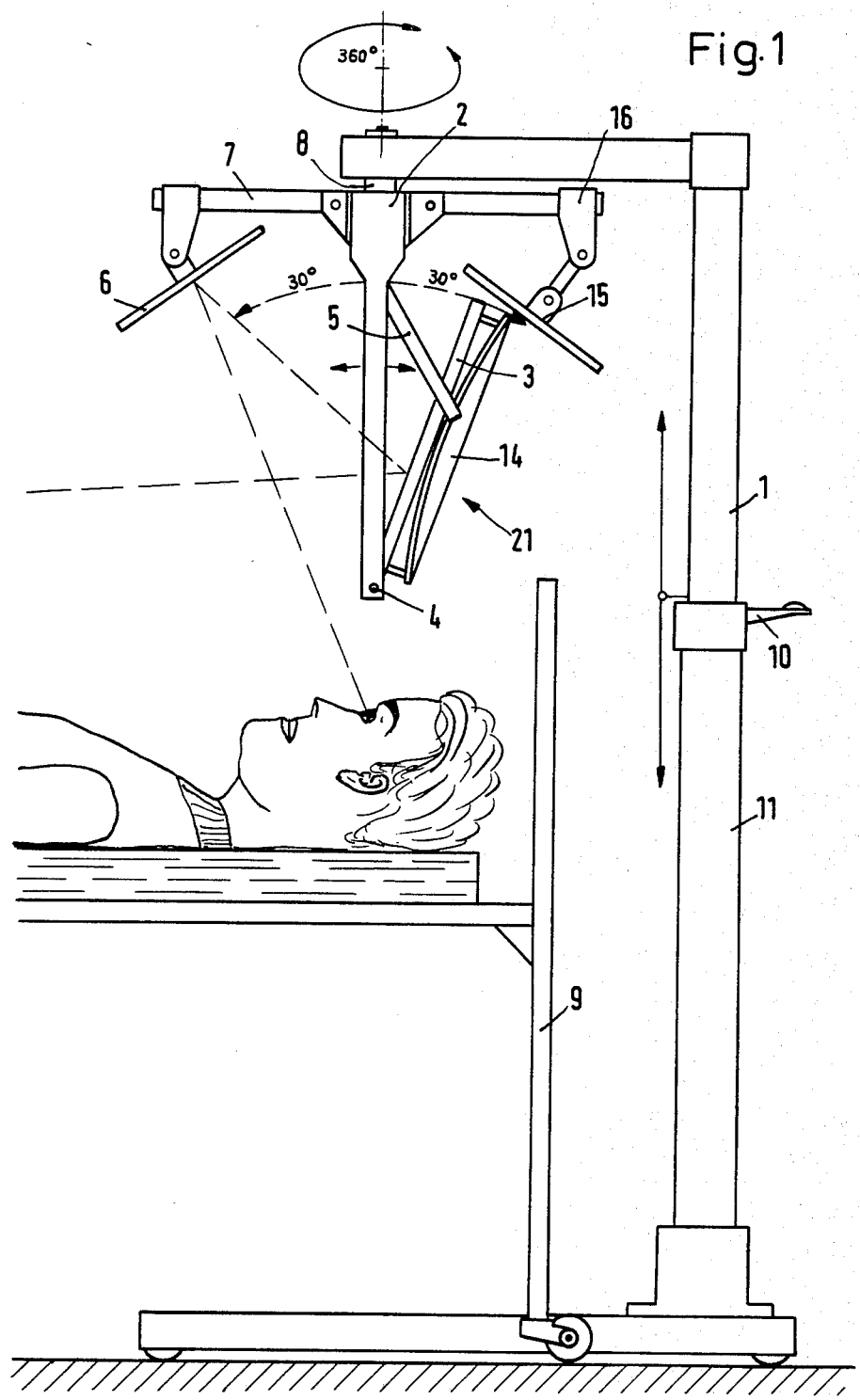
FIG. 1 is a side elevation view of an apparatus according to the invention, including a movable mount.

The present apparatus comprises an angled bracket or mount 1 in which a holding arm 24 secured to a stand 23 is telescopingly extensible from a movable base 11, as shown in FIG. 1. The adjusted height may be fixed by means of a handle 10. One end of the horizontal holding arm 24 has mounted thereto a rotatable shaft 8. This shaft 8 carries a holder 2 of the center mirror 21 and a pair of support arms 7 for the side or lateral mirrors 6 and 15. The lateral mirrors 6 and 15 are pivoted to the ends of the support arm 7 through joints 16. The center mirror 21 comprises a planar mirror 3 and a parabolic mirror 14 on the opposite side. The center mirror 21 has its lower end mounted to a pivot axis 4 about which this mirror may be pivoted from its vertical starting position over and angle of 30° to the front and rear each. Pivoting movement is effected through a driving arm 5.

As shown in FIG. 1, the apparatus is adapted to be moved over the head end 9 of a sick-bed to a position in which the rotatable shaft 8 is positioned above the user's eye. In this state, the apparatus enables the user to overlook the surroundings, without being required to lift his or her head. The optical path is shown in broken lines.

Figure 2:
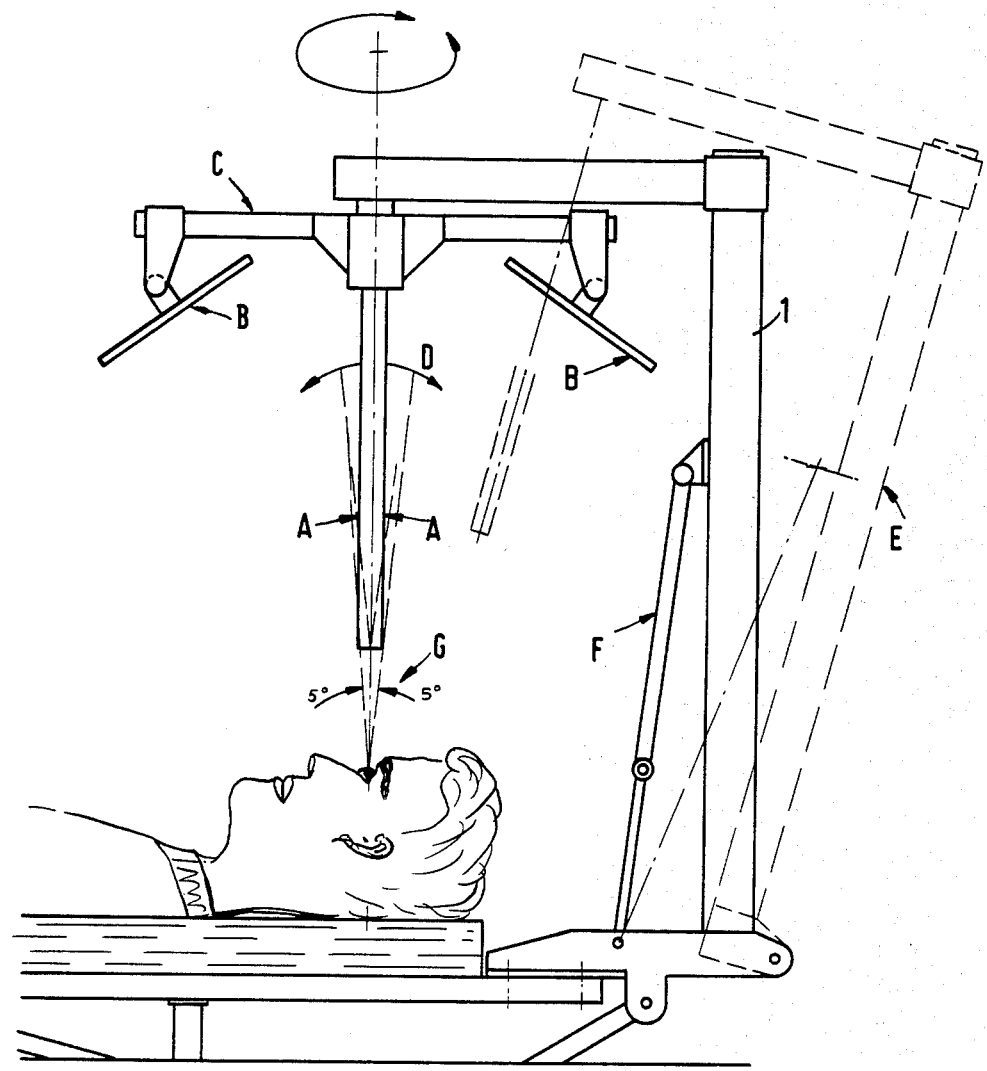
FIG. 2 is a view of another embodiment of the apparatus which is secured to a sick-bed.

FIG. 2 shows another embodiment of the invention, in which the apparatus is mounted to the head end of a motor-driven sick-bed. In this embodiment, the mount 1 is pivotable relative to the bed (pivoted or inclined position shown in broken lines).

Figure 3:
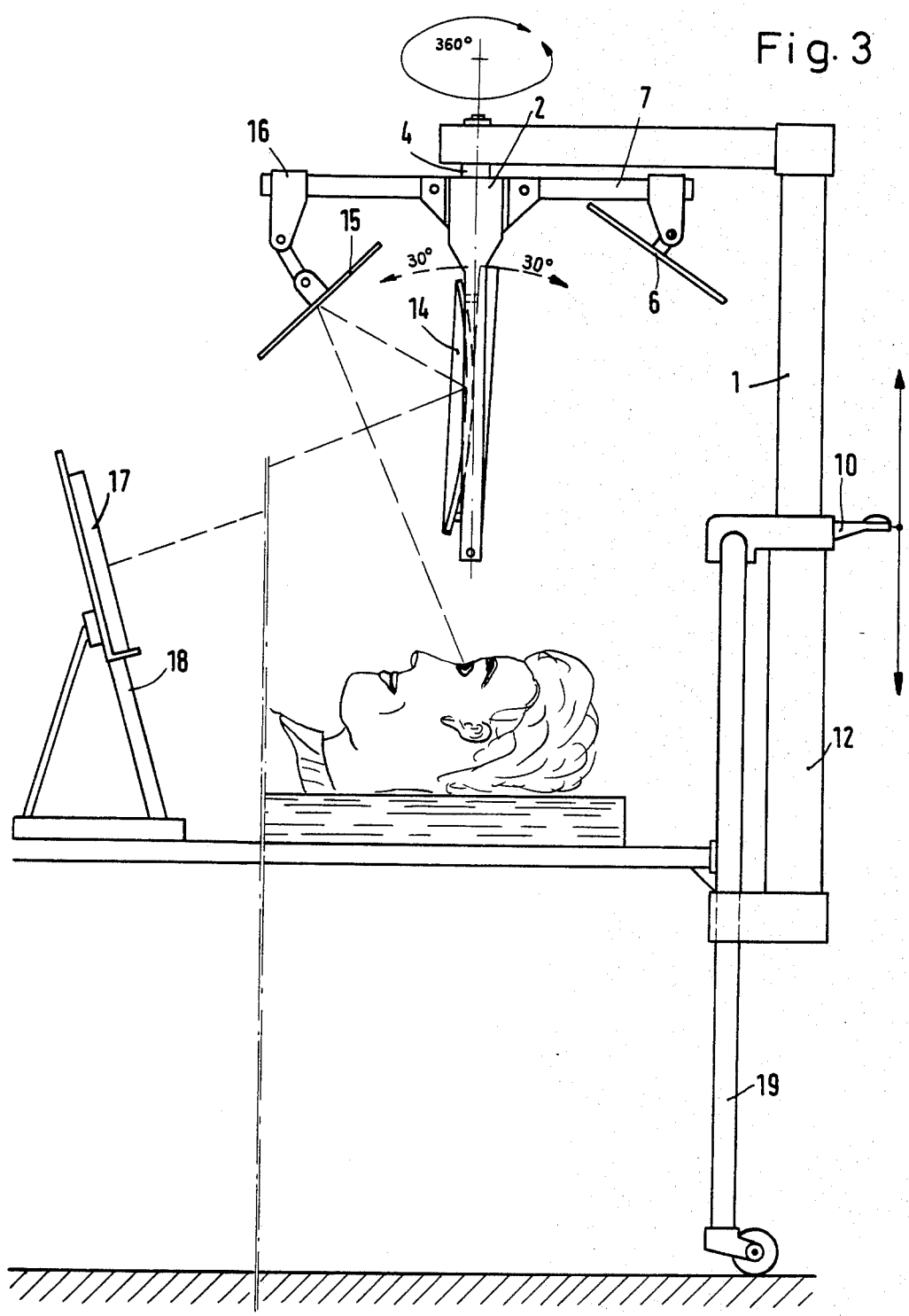
FIG. 3 is a view of a further embodiment of the invention which is mounted to a sick-bed.
Figure 4:
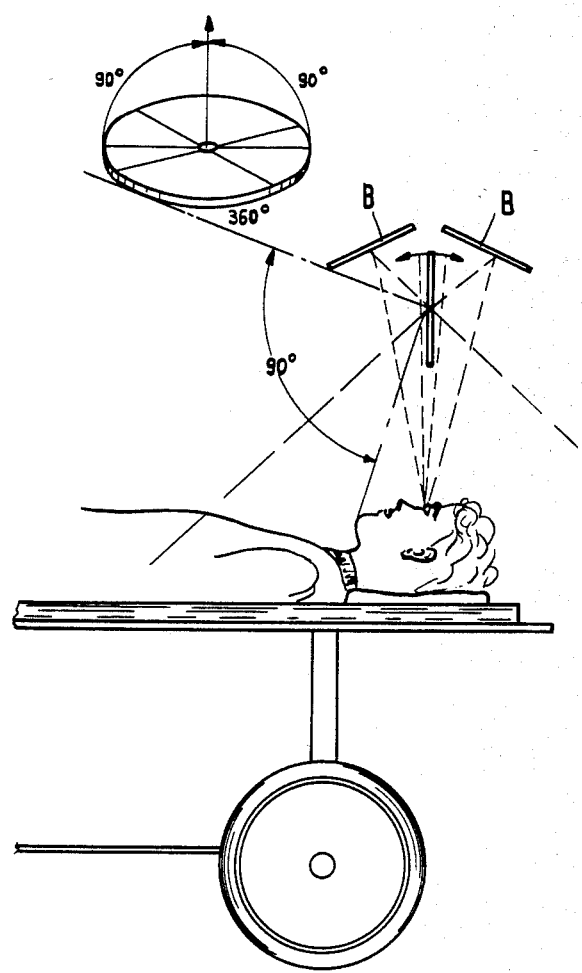
FIG. 4 is a schematical view illustrating the dihedral angle that can be overlooked with the aid of the apparatus.

FIG. 3 illustrates a further embodiment of the invention, in which the apparatus is likewise mounted to the head end 19 of a bed by means of a bracket system 12. In this embodiment, the parabolic mirror 14 is rotated in the forward direction, and the sick person uses the apparatus for reading a book 17 placed on a stand 18, as shown by the broken-line optical path. As shown schematically in FIG. 4, the user of the apparatus has a field of view which spans 360° in the horizontal direction and 90° in vertical direction.

Figure 5:
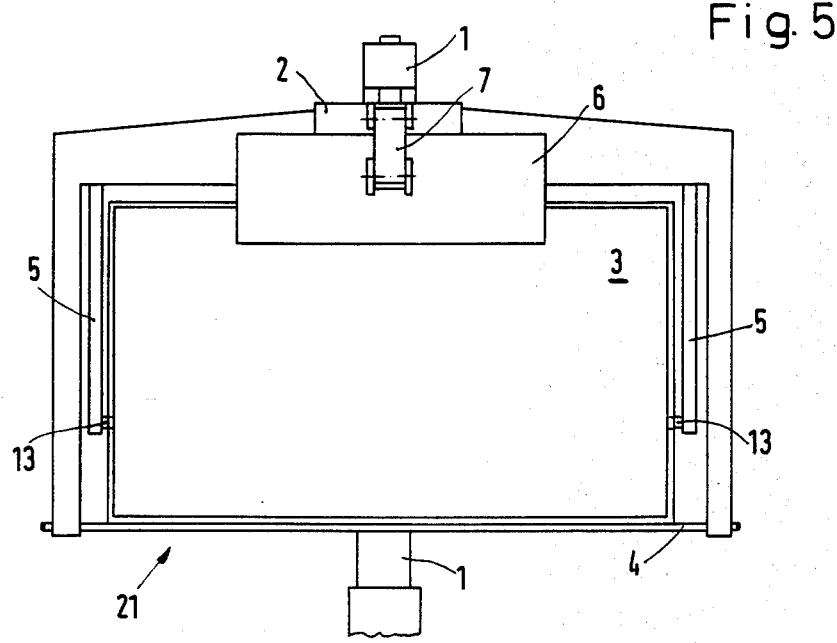
FIG. 5 is a front view of the apparatus according to FIG. 1.
Figure 6:
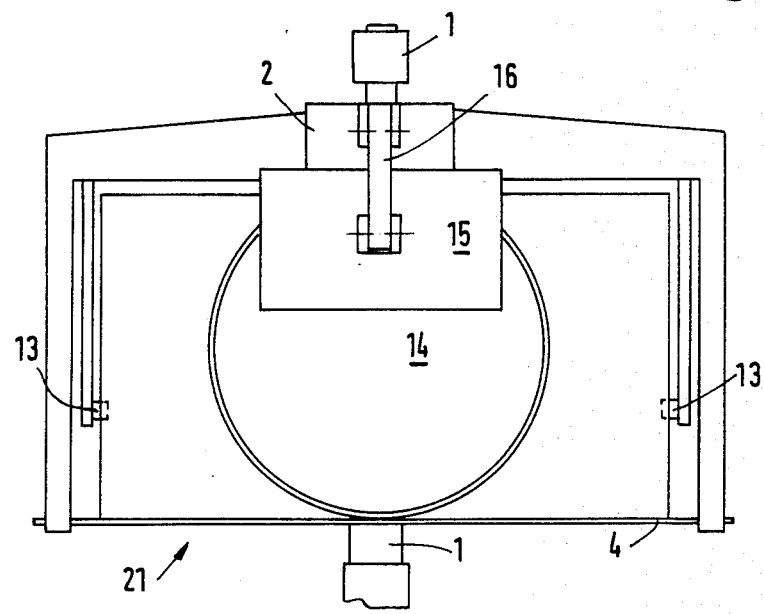
FIG. 6 is a rear view of the apparatus according to FIG. 1.

The front view of FIG. 5 and the rear view of FIG. 6 illustrate especially the attachment of the center mirror 21 which has its lower end supported by the pivot axis 4 and which is connected to the driving arms 5 through hinge bolts 13.

Figure 7A:
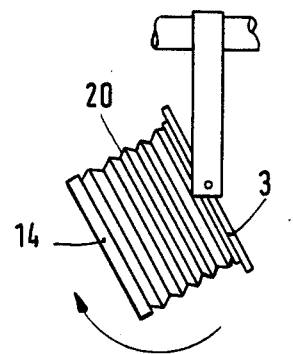
FIGS. 7a and 7b are part views of another embodiment of the center mirror.
Figure 7B:
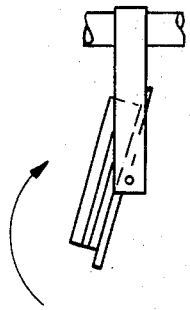

FIGS. 7a and 7b show another embodiment of the center mirror 21, in which the parabolic mirror 14 is disposed on an extensible bellows 20. In this embodiment, the parbolic mirror may be brought to a position suitable for reading.

The driving devices for realizing the various setting positions of the mirror assembly may comprise electric servomotors or, alternatively, pneumatic or hydraulic devices. The use of these driving devices is left to the expert's discretion; therefore, they are not shown in the drawings and need not be described in detail.

The overhead viewing mirror apparatus according to the present invention enables its user to fully overlook the surroundings of the sick-bed. The apparatus provides a perfect universal view (all-around view) and enables the sick person to easily control, i.e. to steer, a movable, motor-driven bed. Still further, the apparatus enables the sick person to read or watch television, and it permits the sick person to make visual contact with a visitor.

Figure 8:
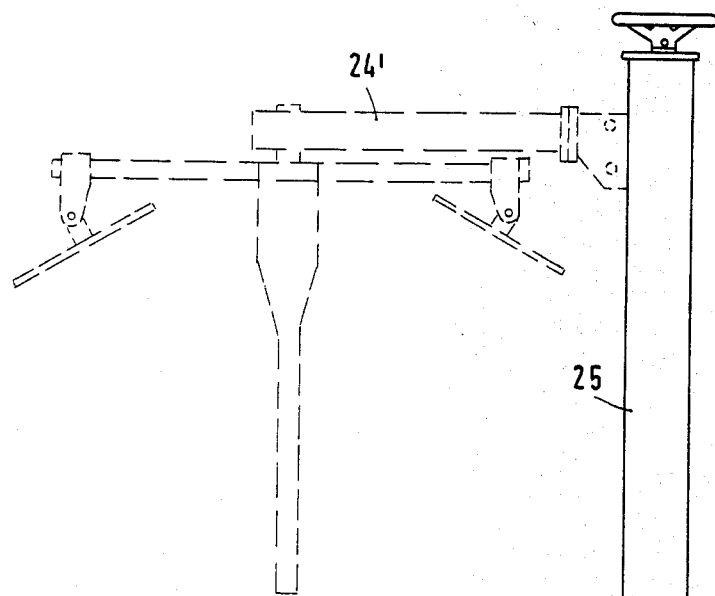
FIGS. 8 and 9 illustrate an embodiment including a vertically adjustable and rotatable mirror assembly.
Figure 8:
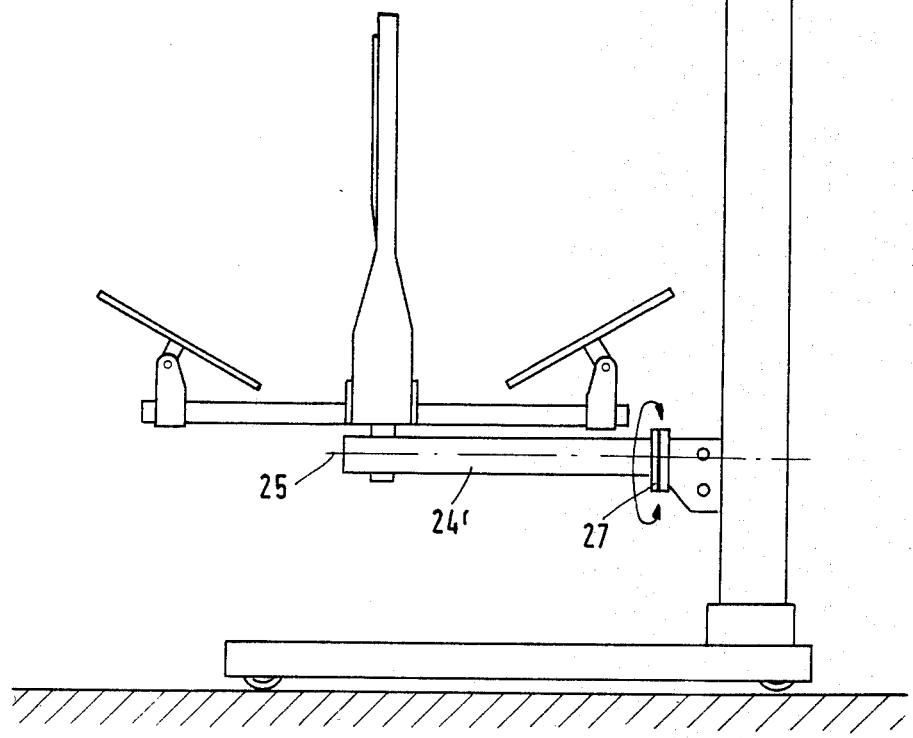
Figure 9:
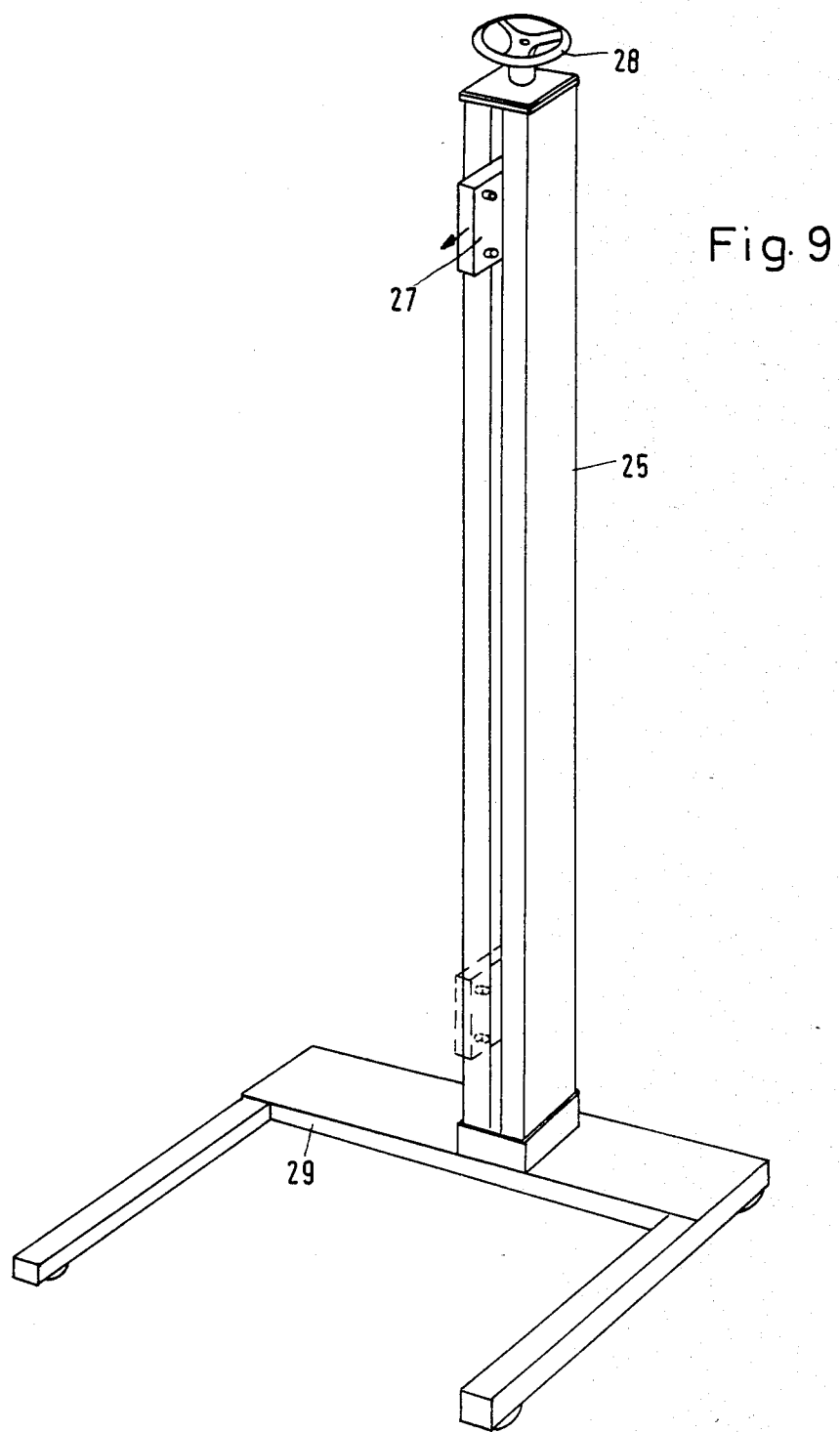

Further, the mirror assembly according to the embodiments may also be mounted to a rotatable holding arm in such a way that the mirror assembly, including the center and lateral mirrors 21, 6, 15, may be rotated as a unit about a generally horizontal axis. At the same time, the holding arm 24' is adapted to be moved vertically along a rail stand 26, and to be locked on the latter. This function is rendered possible by a swivel joint 27 adapted to be moved within the rail stand 26. A corresponding embodiment is shown in FIGS. 8 and 9. Adjustment may be effected with the aid of a handwheel 28, for example, through a spindle shaft (not shown). In this embodiment, too, the mirror assembly as a whole may be arranged to be movable on a running gear. The embodiment described above in connection with FIGS. 8 and 9 is useful for patients which from time to time must be turned from the position lying on the back to the position lying on the face, together with the bed rest.

I claim:

1. An overhead viewing mirror apparatus for bedridden and paralyzed persons, comprising:
   a vertically adjustable mount to which a mirror assembly is attached, wherein the mirror assembly includes
   a center mirror which has a mirror surface on either side thereof and which is adapted to be pivoted from the vertical starting position over an angle of up to 30° to either side about an axis or shaft, and
   a lateral mirror mounted on each side of the center mirror in a position angularly inclined relative to the latter; and
   wherein the mirror assembly is rotatable about a vertical axis or shaft.

2. The apparatus according to claim 1, in which the lateral mirrors are adapted to be pivotable relative to the center mirror.

3. The apparatus according to claim 1, in which the pivoting movement of the center mirror and rotation of the entire mirror assembly are adapted to be effected by driving devices.

4. The apparatus according to claim 1, in which the center mirror has one side thereof formed as a parabolic mirror.

5. The apparatus according to claim 4, which includes an extensible bellows on which said parabolic mirror is disposed.

6. The apparatus according to claim 1, which includes a mount adapted to be mounted to the head end of a sick-bed.

7. The apparatus according to claim 1, in which the center mirror and the lateral mirror are formed of non-shattering glass.

8. The apparatus according to claim 1, in which the mirror assembly, including the center and lateral mirrors, is adapted to be rotated as a unit about a generally horizontal axis.

* * * * *